997,838. THERMO-ELECTRIC CIRCUIT-BREAKER. EDWARD W. LEEPER, Chicago, Ill., assignor, by mesne assignments, to Frank B. Cook, Chicago, Ill. Filed May 28, 1904, Serial No. 210,30:. Renewed Nov. 23, 1910. Serial No. 593,959.

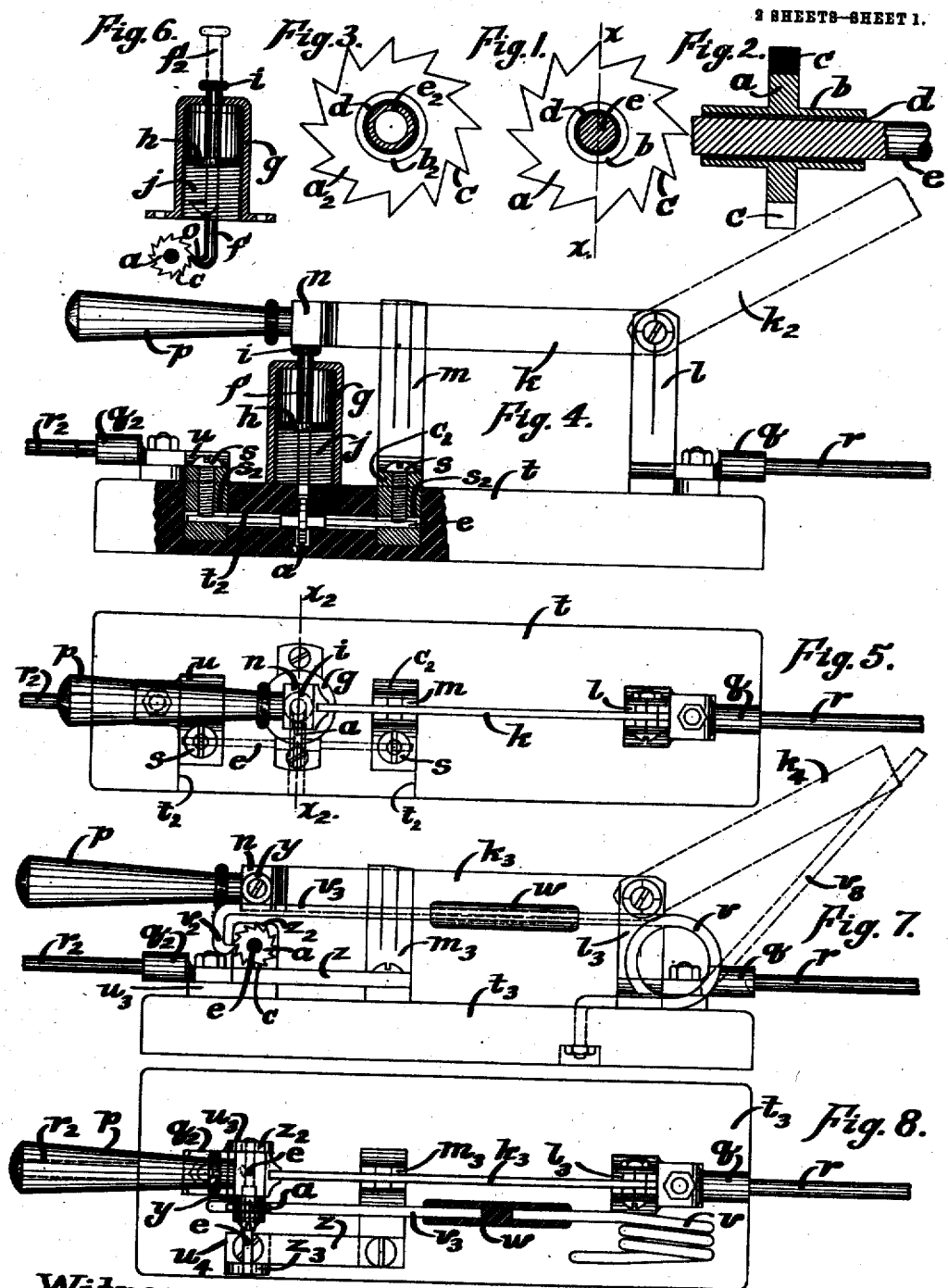

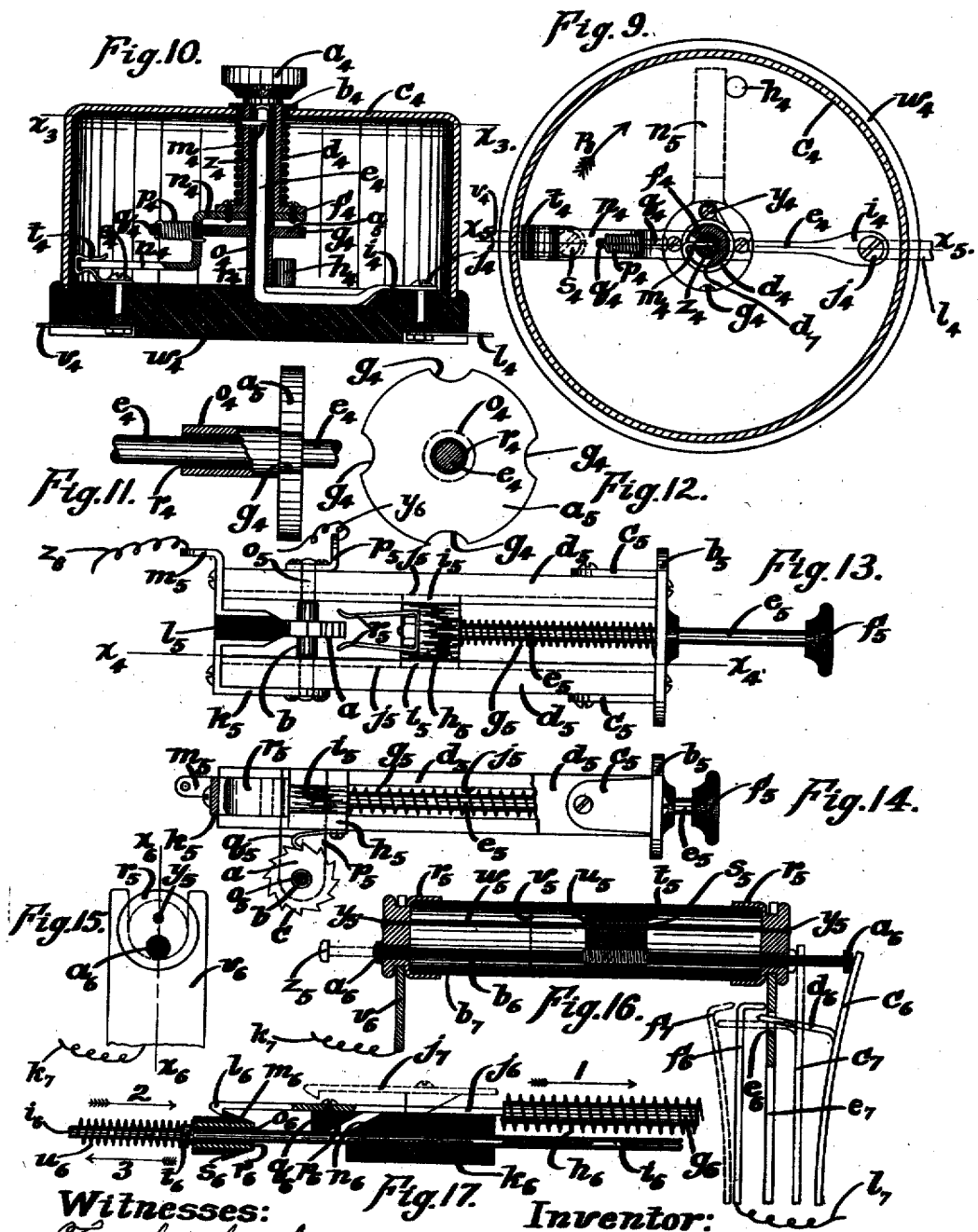

*To all whom it may concern:*

Be it known that I, EDWARD W. LEEPER, a citizen of the United States, residing at Chicago, in the county of Cook and State of Illinois, have invented new and useful Improvements in Thermo-Electric Circuit Breakers, of which the following is a full, clear, concise, and exact description, reference being had to the accompanying drawings, forming a part of this specification.

My invention relates to thermal cut-outs or circuit breakers for electric circuits, my object being, first, to provide such a device adapted for use in connection with either large or small currents, and, second, to provide means whereby such a device may be used in connection with various forms of switches and switching apparatus.

The usual form of circuit-breaker is a magnetically-operable device, that is, a device for automatically opening a circuit operated by the magnetism produced therein by an excessive current in the circuit. In my present invention I have provided a circuit breaker which is automatically operated by the heat produced by an excessive current in the circuit.

There are several advantages in my thermal circuit breaker over a magnetic circuit breaker, one being, that with a momentary rise in the current, above the normal, which would not be detrimental to the apparatus of the circuit, the thermal circuit breaker will not operate, while a magnetic circuit breaker will; the latter thus opening the circuit when it is not necessary. Another advantage being, that with a very gradual increase of current in the circuit, the thermal circuit breaker will always operate when the current slightly exceeds the normal, whereas a magnetic circuit breaker may often fail to operate, the latter therefore not protecting the circuit when such protection is required. With a momentary rise in the current, above the normal, the magnetism produced in the magnetic device would be sufficient to trip its releasing mechanism and thereby open the circuit, but the heat produced in the thermal device would not be sufficient to cause same to operate. With a gradual rise in the current, above the normal, the tripping device in the magnetic circuit breaker may operate so gradually that the catch will not release and open the circuit until the current in the circuit is much in excess of the normal, there being no throw of the plunger to cause the device to operate; while in my thermal circuit breaker, the heat produced by the gradual rise in the current, will operate the device as soon as the current is slightly in excess of the normal, the gradual increase in current being just as effective as a steady current slightly in excess of the normal.

Another advantage in my thermal circuit breaker is that it is equally adapted to both direct and alternating currents.

In my present invention I employ a heat-producing conductor, preferably a straight piece of resistance wire, upon which is soldered a rotary detent, or toothed wheel, by a heat-susceptible material which is readily affected by heat. The heat produced in the said conductor by an abnormally large current therein, softens the heat-susceptible material and thereby allows the said detent to turn upon the said conductor and thus release a spring-controlled mechanism which operates a circuit controlling means. When the heat-susceptible material becomes cool, the said detent is again secured to the heat-producing conductor and is then ready to reëngage the spring-controlled means. I also provide a modified form of the invention in which a sliding mechanism is secured to the heat-producing conductor by a heat-susceptible material, and adapted to slide lengthwise on the said conductor when the heat-susceptible material is softened. This sliding mechanism may be returned to its normal position upon the conductor, before the heat-susceptible material cools, after operation, or it may be used in its new position upon the said conductor as will be hereinafter shown. The heat-producing conductor may be a solid conductor or a hollow conductor, to suit the requirements.

Another feature of the invention is, that when the thermally-operable device is employed to operate an ordinary switch, the switch may be manually operated, independently of the said thermally-operable device.

I will more particularly describe my invention by reference to the accompanying drawings, illustrating same, in which,—

Figure 1 is a side elevation of the rotary detent secured to a solid heat-producing conductor by a heat-susceptible material; Fig. 2 is a cross-sectional view of Fig. 1, taken on line *x*—*x*; Fig. 3 is a side elevation of the rotary detent secured to a hollow heat-producing conductor by a heat-susceptible material; Fig. 4 is a side elevation of the invention, applied to a knife switch, with portions shown in cross-section; Fig. 5 is a top view of Fig. 4; Fig. 6 is a cross-sectional view of the invention as applied in Figs. 4 and 5, taken on line $x_2$—$x_2$ of Fig. 5, with portions shown in elevation; Fig. 7 is a side elevation of a modified form of the invention, applied to a knife switch, with a small portion removed; Fig. 8 is a top view of Fig. 7, with a small portion shown in cross-section; Fig. 9 is a top view of a snap switch provided with a modification of the invention, with portions shown in cross-section taken on line $x_3$—$x_3$ of Fig. 10; Fig. 10 is a cross-sectional view of Fig. 9, taken on line $x_5$—$x_5$, with portions shown in elevation; Figs. 11 and 12 show details of the modified form of rotary detent used in Figs. 9 and 10, secured to the heat producing conductor by a heat-susceptible material; Fig. 13 is a side elevation of a type of push-button switch with the invention applied thereto; Fig. 14 is a cross-sectional view of Fig. 13, taken on line $x_4$—$x_4$, with portions shown in elevation; Fig. 15 is an end elevation of a tubular cut-out in which the principles of the invention are employed; Fig. 16 is a cross-sectional view of Fig. 15, taken on line $x_6$—$x_6$, with portions shown in elevation; and Fig. 17 is a longitudinal view of a portion of an automatic, thermal, circuit breaker, or cut-out, in which the principles of the invention are applied, with portions shown in cross-section.

Like characters refer to like parts in the several figures.

The switch of Figs. 4 and 5, comprising the jaws $l$ and $m$, blade $k$, and handle $p$, is suitably mounted upon an insulating base $t$. The base $t$ is cut away at $t_2$ to allow the resistance conductor $c$ to be inserted therein and in slots $s_1$ $s_2$ in the respective lugs $u$ and $c_2$ where it is held in place by screws $s$ $s$. The toothed wheel $a$ is secured to the resistance conductor $c$ by a fusible material $d$, Figs. 1 and 2, and is provided with a sleeve portion $b$ which extends along the conductor $c$ so as to give a larger soldering surface. The teeth $c$ of wheel $a$, are each adapted to engage a catch $o$ of a pin $f$, Fig. 6. The pin $f$ carries a disk $h$ and extends through one end of the cylindrical casing $g$ to an insulating knob $i$. The casing $g$ is fastened to the base $t$, and contains a coil-spring $j$ which acts on the disk $h$. Line conductor $r$ is connected to lug $q$ which is connected to jaws $l$, and line conductor $r_2$ is connected to lug $q_2$ which is connected to lug $u$. The circuit through the device is, from conductor $r_2$, through lug $q_2$, lug $u$, resistance conductor $c$, lug $c_2$, jaws $m$, blade $k$, jaws $l$, lug $q$, and conductor $r$. When the device is set, the switch is closed in the usual manner, thereby causing the insulating block $n$ to press on the knob $i$, in the position $f_2$, Fig. 6, and thus depress the pin $f$ to the position shown in Fig. 4, or more clearly in Fig. 6, where the catch $o$ engages one of the teeth $c$ of wheel $a$, the disk $h$ at the same time depressing spring $j$ to the position shown. It will be readily seen that the wheel $a$ holds the pin $f$ and spring $j$ in this set position, and that the switch may be opened and closed entirely independent of the excess current operable device. When an abnormally large current traverses the heat-producing conductor $c$ for a short length of time, the heat produced in conductor $c$ softens the heat-susceptible material $d$ and thereby allows the wheel $a$ to be turned upon the conductor $c$ by the pin $f$, due to the tension in spring $j$. When the catch $o$ is released by the tooth $c$, the pin $f$ takes the position $f_2$, due to the spring $j$, which forces the blade $k$ of the switch, from the jaws $m$, and throws $k$ to the position $k_2$, thus opening the circuit. When the fusible material $d$ cools and hardens, the toothed wheel $a$ is resoldered to the conductor $c$, in a new operative position. The apparatus can then be reset, and operated again, as just described. This cycle of operations may be repeated as many times as desired.

In Figs. 7 and 8, I have shown a spring $v_3$ extending parallel with the switch blade $k_3$, provided with a coiled portion $v$ at one end thereof, and a catch $v_2$ at the other end thereof adapted to engage a tooth $c$ of the wheel $a$. I have provided an insulating portion $w$ separating the portions $v$ and $v_3$ of the spring, in order to provide additional insulation between the jaws $l_3$ and $m_3$ of the switch, when the spring is in a set position and the switch is opened. The portion $v$ of the spring is suitably secured to the insulating base $t_3$ and insulated from the jaws $l_3$. The resistance conductor $c$ is supported by two lugs $z_2$ and $z_3$, and carries the toothed wheel $a$ near its center. Lug $z_3$ is conductively connected with the jaws $m_3$ by the strip $z$. When the device is set, the switch is closed in the usual manner, thereby causing the insulating roller $y$ to depress the spring $v_3$ until the portion $v_2$ thereof engages a tooth $c$ of the wheel $a$. It will be readily seen that the switch may be operated independently of the spring $v_3$ which remains in a set position when the switch is opened and closed. The circuit through the apparatus is, from conductor $r_2$, through lug $q_2$, lug $v_3$ and portion $z_2$ thereof, resistance conductor $c$, lug $z_3$, strip $z$, jaws $m_3$, blade $k_3$, jaws $l_3$, lug $q$, and conductor $r$. When an abnormally large current traverses the resistance conductor $c$ for a short length of time, the heat produced therein softens the fusible material $d$ and allows the toothed wheel $a$ to be turned upon the conductor $c$ by the spring $v$ $v_3$, until the tooth $c$ releases the catch $v_2$ and allows the spring $v$ $v_3$ to throw the switch blade $k_3$ to the position $k_4$, the spring $v$ $v_3$ taking the position $v_3$, and thereby opens the circuit. When the fusible material cools, the wheel $a$ is again secured to the conductor $e$, after which the device may be reset and then operated again, as just described.

In Figs. 9 to 12, inclusive, the sleeve $o_4$ of wheel $a_5$, is secured to the heat-producing conductor $c_4$ by a heat-susceptible material $r_4$. This can be more plainly seen in Figs. 11 and 12, where it is also seen that wheel $a_5$ is provided with indentures $g_4$ $g_4$ at its periphery. The switch blade $n_4$, preferably formed as shown, is provided with a hole therethrough, through which an insulating pin $q_4$ passes and rests at its curved inner end in an indenture $g_4$ of wheel $a_5$, where it is held in place by a spring $p_4$. The outer end of blade $n_4$ rests between the jaws of a contact member $t_4$ which is conductively secured to the line conductor $v_4$, by bolt $s_4$. The resistance conductor $c_4$ is preferably flattened at $i_4$ and is conductively secured to the line conductor $l_4$ by bolt $j_4$. An insulating sleeve $z_4$ is loosely placed over the upper portion of the resistance conductor $c_4$ and to it is rigidly secured the conducting sleeve $f_4$ which is also rigidly secured to the switch blade $n_4$. A coil spring $d_4$ is placed over the sleeve $f_4$, one end of $d_4$ being secured to sleeve $f_4$ by screw $y_4$, and the other end of $d_4$ being secured to conductor $c_4$ at $m_4$, the sleeves $f_4$ and $z_4$ being cut away at $d_7$ to allow the end of spring $d_4$ to pass therethrough. The sleeve $f_4$ extends through a cover $e_4$ which incloses the device as a whole, and which is insulated from the sleeve $f_4$ by an insulating bushing $b_4$. A knob $a_4$ is secured to the sleeve $f_4$ for manually operating the switch. When the heat susceptible material $r_4$ is softened, the tension in spring $d_4$ is sufficient to turn the wheel $a_5$ and switch blade $n_4$, in the direction of arrow $p_4$, the blade $n_4$ being held to the wheel $a_5$ by a pin $q_4$. But when the wheel $a_5$ is soldered to the conductor $c_4$, the tension in spring $d_4$ is not sufficient to turn the switch blade $n_4$ against the holding power of pin $q_4$. The holding power of pin $q_4$ in indenture $g_4$ is not great enough, however, but what the switch may be manually operated, (opened and closed) by the thumb knob $a_4$, the pin $q_4$ slipping from the indenture $g_4$. The circuit through the device is, from line conductor $v_4$, through bolt $s_4$, contact member $t_4$, switch blade $n_4$, sleeve $f_4$, spring $d_4$, heat-producing conductor $c_4$, bolt $j_4$, and line conductor $l_4$. When the heat-susceptible material $r_4$ is softened, by an abnormally large current traversing the resistance conductor $c_4$, the tension in spring $d_4$ causes the wheel $a_5$, switch blade $n_4$, and sleeves $f_4$ and $z_4$, to turn upon the conductor $c_4$, in the direction of arrow $p_4$, to the position indicated by $n_4$, Fig. 9, thus opening the switch, the blade $n_4$ coming against the stop $h_4$. When the fusible material $r_4$ becomes cool, the wheel $a_5$ is again soldered to the conductor $c_4$. Now, by turning the knob $a_4$ in the opposite direction to that indicated by arrow $p_4$, the switch blade may be reset to its initial closed position, against the tension in spring $d_4$, the pin $q_4$ slipping from one indenture $g_4$ to the next where it again holds the blade $n_4$ in a set position against the tension in spring $d_4$. The switch may be operated and reset, again and again, as just described, each time the pin $q_4$ engaging a new indenture $g_4$.

In Figs. 13 and 14, I have adapted the invention for use in connection with a push-button switch. The insulating head $h_5$ is provided with projections $i_5$ $i_5$ thereon, adapted to slide in grooves $j_5$ $j_5$ of guides $d_5$ $d_5$, and is mounted on the end of pin $e_5$ which extends through the plate $b_5$ to the button $f_5$. The switch blades $r_5$ are secured to the head $h_5$, preferably as shown, and are adapted to engage the contact members $m_5$ and $k_5$, which are insulated from each other by the insulating block $l_5$, when the switch is closed. The heat-producing conductor $o_5$ carrying the toothed wheel $a$ which is secured thereto by a heat-susceptible material is supported by a bracket $p_5$ and a portion of $k_5$. A catch spring $q_5$ is secured to the head $h_5$ and adapted to engage a tooth $c$ of wheel $a$ when the device is set. When the switch is closed, the head $h_5$ is slid along the guides $d_5$ $d_5$ until the blades $r_5$ engage the contact members $m_5$ and $k_5$, and the catch spring $q_5$ engages a tooth $c$ of wheel $a$ and thus holds the head $h_5$ in this set position against the tension in spring $g_5$ which now tends to open the switch. The circuit through the device is, from line conductor $z_5$, through contact member $m_5$, switch blades $r_5$, contact member $k_5$, resistance conductor $o_5$, bracket $p_5$, and line conductor $y_5$. When an abnormally large current traverses the heat-producing conductor $o_5$, the heat produced therein softens the heat-susceptible material and allows the toothed wheel $a$ to be turned upon conductor $o_5$ by the spring $q_5$, due to the tension in spring $g_5$ which slides the head $h_5$ to the position shown in Fig. 13 and thereby opens the switch, the spring $q_5$ being released from the wheel $a$ which is now turned to a new position upon conductor $o_5$. When the heat susceptible material cools and hardens, the wheel $a$ is resoldered to conductor $o_5$, in its new position. The device may now be reset, the catch spring $q_5$ engaging a new tooth $c$ of wheel $a$ and thereby holding the head $h_5$ in an operative position against the tension in spring $g_5$. The device may be operated and reset, as just described, as many times as desired.

In Figs. 15 and 16 I have shown a modified form of the invention, in which the piston $t_5$ slides upon the heat-producing conductor $w_5$ which is secured to the conducting end caps $r_8$, $r_8$ of the insulating tube $b_7$, preferably by solder $y_8$, $y_8$. A metal sleeve $u_8$ is rigidly secured to the piston $t_8$ and is soldered to the resistance wire $w_8$ by an easily fusible material $s_8$. The piston $t_8$ is secured to an insulating rod $b_8$ which extends through the metal caps $r_8$, $r_8$ and terminates in enlarged end portions $a_8$, $a_8$ which prevent the spring member $c_8$ from coming in contact with an end cap $r_8$ when the device operates. The device thus described is supported upon two contact members $v_8$ and $e_7$ which are adapted to engage the end caps $r_8$, $r_8$, respectively, as shown in Fig. 15. Line spring $f_8$ normally makes contact with contact member $e_7$. Ground spring $c_8$ is provided with a projecting point $d_8$ which extends through a hole $e_8$ in contact member $e_7$, but not making contact with $e_7$, and is normally held out of contact with spring $f_8$ by rod $b_8$. The circuit through the device is, from conductor $k_7$, through contact member $v_8$, one end cap $r_8$, resistance wire $w_8$, the other end cap $r_8$, contact member $e_7$, spring $f_8$, and conductor $l_7$. When an abnormally large current traverses the resistance wire $w_8$ for a short time, the heat produced therein softens the heat-susceptible material $s_8$ and allows the piston $t_8$ and sleeve $u_8$ to be slid upon the wire $w_8$ to the position $v_8$, by the tension in spring $c_8$ the rod $b_8$ taking the position $z_8$, and spring $c_8$ taking the position $c_7$ and thereby forcing spring $f_8$ to the position $f_7$. It will be seen that the circuit is now broken between spring $f_8$ and contact member $e_7$, and that spring $f_8$ is now connected with spring $c_8$. If spring $c_8$ is grounded, there will be a ground thrown on the line conductor $l_7$ and thus the objectionable current from $l_7$ will be connected to earth. When the heat-susceptible material $s_8$ cools, the sleeve $u_8$ is resoldered to the resistance wire $w_8$ in the position $v_8$. When the apparatus is reset, the tubular portion is turned end for end and inserted in place in the contact members $v_8$ and $e_7$, the spring $c_8$ being sprung to its initial operative position as shown in Fig. 16. When the device is again operated, the piston $t_8$ is slid on the wire $w_8$ to its initial position. When the apparatus is again reset, the tubular portion is turned end for end as before. This operating and resetting of the device may be repeated again and again. This form of device is particularly applicable to circuits in which very small currents are used, as, for example, telephone systems.

I have shown still another modified form of my invention in Fig. 17, in which a spring member $j_9$, controlled by a coil spring $h_9$, is provided with a catch $l_9$ which normally engages a rim $s_9$ of an insulating sleeve $m_9$ which is rigidly secured to a metallic sleeve $r_9$ which is in turn secured to the heat-producing conductor $i_9$ by a heat-susceptible material $o_9$. Spring $h_9$ tends to pull the sleeve $m_9$ in the direction of arrows 1 and 2, against the heat-susceptible material $o_9$ which holds the sleeve $m_9$ stationary. The coil spring $u_9$ acts on sleeve $m_9$, tending to pull it in the direction of arrow 3. An insulating block $k_9$, provided with a sloping surface $n_9$, is rigidly secured to the resistance conductor $i_9$. An insulating block $q_9$, provided with a sloping surface $p_9$, is rigidly secured to the spring member $j_9$. When the heat susceptible material $o_9$ is softened, by an abnormally large current in the heat-producing conductor $i_9$, the spring $h_9$ causes catch $l_9$ to slide the sleeves $m_9$ and $r_9$ upon conductor $i_9$ in the direction of arrows 1 and 2, against the tension in spring $u_9$, until block $q_9$ comes in contact with block $k_9$ and raises sufficiently to cause catch $l_9$ to release the sleeve $m_9$, the latter then returning to its original position against stop $t_9$, due to the tension in spring $u_9$, the spring member $j_9$ taking the position indicated by $j_7$. The spring member $j_9$, in moving to the position $j_7$, may operate a circuit controlling means, as, for example, springs similar to those shown in Fig. 16, and thereby open the circuit through conductor $i_9$. When the heat-susceptible material $o_9$ cools, the sleeve $r_9$ is again soldered to the conductor $i_9$ as originally. In resetting the apparatus, the spring member $j_9$ is moved from the position $j_7$, in the direction of arrow 3, until the catch $l_9$ again engages the rim $s_9$ of sleeve $m_9$, as originally. The operation and resetting of the device, as just described, may then be repeated again and again.

I do not wish to limit this invention to the particular details of construction as herein shown, as many modifications of same may be made without departing from the priciples involved.

Having thus described my invention, what I claim as new and desire to secure by Letters Patent, is—

1. In a thermal circuit breaker for electric circuits, the combination of a resistance rod, a toothed wheel secured thereon by a heat-susceptible material, a catch adapted to engage the said wheel, a spring-controlled mechanism for controlling the said catch and tending to turn the wheel upon the said rod, and a suitable switch to be operated by the spring-controlled mechanism when the heat-susceptible material is softened.

2. In a thermo-electric circuit breaker, the combination of a switch, a resistance rod connected in circuit therewith, a rotary detent secured to the resistance rod by a heat-susceptible material, and a spring-controlled means adapted to engage the rotary detent, and to operate the said switch when the heat-susceptible material is softened.

3. In apparatus of the class specified, the combination of a metallic resistance rod, a rotary detent secured thereto by a heat-susceptible material, a circuit controlling means, and means for turning the said detent upon the said resistance rod when the heat-susceptible material is softened, and thereby controlling a circuit.

4. In apparatus of the class specified, the combination of a metallic resistance conductor, a conductive portion encircling the said conductor and secured thereto by a heat-susceptible material, a circuit controlling means, and means for moving the said conductive portion upon the said conductor when the heat-susceptible material is softened, and thereby controlling a circuit.

5. In a thermo-electric device of the character described, the combination of a metallic resistance conductor, a toothed wheel threaded upon the conductor, a heat-susceptible material securing the said wheel in place upon the conductor, under normal circuit conditions, and means for turning the said wheel upon the conductor under abnormal circuit conditions, to operate a circuit controlling means.

6. In apparatus of the class specified, the combination of a metallic heat-producing wire, a conductive portion threaded thereupon, a heat-susceptible material normally securing the said conductive portion to the said wire, and a spring-controlled mechanism adapted to move the said conductive portion upon the said wire, upon an abnormally large current in the circuit, to operate a circuit controlling means.

7. In apparatus of the class specified, the combination of a metallic heat-producing conductor, a wheel placed upon the said conductor, a fusible material normally securing the said wheel to the said conductor, a series of engaging devices on the said wheel, a spring-controlled means adapted to engage an engaging device of the wheel and tending to turn the said wheel upon the said conductor and thereby break the fusible material, and a switch adapted to be operated by the spring-controlled means when the latter is released by the softening of the fusible material, the operation of the device bringing the said engaging devices successively into engaging position with their engaging means, substantially as described.

8. The combination with a manually-operable switch for electric circuits, of a thermally-operable device comprising a spring-controlled member normally held in a set position by a detent normally secured upon a heat-producing conductor, and adapted to automatically operate the said switch upon an abnormally large current in the circuit, the said switch being adapted to automatically set the thermally-operable device to operative position when manually operated, and also being adapted to be manually operated independently of the thermally-operable device.

9. The combination with a manually-operable switch for electric circuits, of a thermally-operable self-soldering circuit breaker device adapted to automatically operate the said switch upon an abnormally large current in the circuit, the said switch being entirely independent of the circuit breaker device as far as the manual operation of the switch is concerned.

10. In a thermo-electric circuit breaker, the combination of a switch, a resistance conductor in circuit with the switch, a detent placed upon the said conductor and secured thereto by a heat-susceptible material, a catch for engaging the said detent, and a spring member apart from the said circuit and adapted to release the said catch from the detent, when the heat-susceptible material is softened, and thereby operate the switch.

11. In a thermo-electric circuit breaker, the combination of a switch, a resistance conductor in circuit with the switch, a detent placed upon the said conductor and secured thereto by a heat-susceptible material, an engaging means for the said detent and tending to move the latter upon the said conductor, and a spring member apart from the said circuit and adapted to move the said detent upon the said conductor when the heat-susceptible material is softened, and thereby operate the switch.

12. In a thermo-electric circuit breaker, the combination of a switch, a resistance conductor for inclusion in a circuit, a detent placed upon the said conductor, a heat-susceptible material normally holding the detent in place upon the said conductor, an engaging means for the said detent and tending to move the latter upon the said conductor, and a coil spring adapted to operate the said detent upon the said conductor, when an abnormally large current traverses the latter, and thereby operate the switch, the said detent being again secured to the said conductor in an operative position, by the cooling of the heat-susceptible material, substantially as described.

13. The combination with a switch, of a heat-producing conductor in the form of a rod, in circuit with the switch, a rotary detent secured upon the said conductor by a heat-susceptible material, a series of engaging devices on the said detent, a pin, one end of which is adapted to engage an engaging device of the said detent, a coil spring acting upon the said pin and tending to disengage same from the said detent and thereby open the switch, the said spring causing the pin to turn the detent upon the said conductor and thereby open the switch, upon the passage of an abnormally large current in the circuit, and means for resetting the apparatus after operation, the said pin then engaging a new engaging device of the detent, substantially as described.

14. In a thermo-electric circuit breaker, the combination with a manually-operable switch, of a resistance conductor extending between two lugs and rigidly secured to the latter, the said conductor being in circuit with the switch, a toothed wheel secured upon the said conductor by a heat-susceptible material, a catch adapted to engage the toothed wheel, a coil spring acting upon the said catch and tending to turn the toothed wheel upon the said conductor, the said spring causing the said catch to turn the toothed wheel upon the said conductor when the heat-susceptible material is softened by an abnormally large current in the circuit, and thereby open the switch, the toothed wheel being resoldered upon the said conductor in a new engaging position, when the heat-susceptible material cools, and means for reëngaging the said catch with the toothed wheel, to reset the device, the said switch being free to be manually operated, when the device is reset, substantially as described.

15. In a thermo-electric circuit breaker, the combination with a manually-operable switch mounted upon a suitable base, of a resistance conductor in circuit with the said switch and suitably secured to lugs which are seated in the said base, a toothed wheel placed upon the said conductor, a fusible material securing the toothed wheel to the said conductor, a suitable slot in the said base to allow the said conductor and toothed wheel to be inserted therein, a pin provided with an insulating knob on one end and a catch on the other adapted to engage the toothed wheel, a disk near the middle of the said pin, a cylindrical casing secured to the said base, a coil spring within the said casing and adapted to act on the said disk, suitable conductors leading from the apparatus, the said spring causing the catch to turn the toothed wheel upon the said conductor and thereby release the said catch from the toothed wheel and allow the said spring to cause the said pin to open the switch, upon an abnormally large current in the circuit, the toothed wheel being resoldered to the said conductor by the fusible material, in a new operative position, when the latter cools, and a handle on the switch, adapted to depress the said pin, against the tension of the said spring, and cause the catch to reëngage the toothed wheel, to reset the apparatus, the switch being adapted for manual operation independently of the set thermally-operable device, substantially as described.

16. In a thermo-electric device of the character described, a heat-producing resistance rod, a detent threaded upon said rod, a heat-susceptible material for normally securing said detent to said rod, and means for moving said detent relatively to said rod upon an abnormal current in the latter.

17. In a thermo-electric device of the character described, a heat-producing resistance rod, a rotary detent threaded upon said rod, a heat-susceptible material for normally holding said detent against rotation, and means adapted to engage said detent and to turn same upon said rod, when the heat-susceptible material is softened.

18. In a device of the character described, a heat-producing resistance rod for inclusion in a circuit, a toothed wheel threaded upon said rod and normally held against rotation by a heat susceptible material, and means adapted to engage a tooth of said wheel and to turn the latter upon the said rod under abnormal current conditions, thereby bringing another tooth of said wheel to an engaging position with said engaging means, the said wheel being included or not included in the circuit, substantially as described.

19. In a device of the character described, a heat-producing resistance rod for inclusion in the circuit, a rotary detent threaded upon said rod and normally held in a fixed position thereon, a series of engaging devices on the said detent, a switch in circuit with said resistance rod, an engaging means for the said engaging devices, and a spring means adapted to cause said engaging means to turn said detent upon the resistance rod upon an abnormally large current in the circuit, and to operate the said switch when said engaging means is released from said detent, substantially as described.

20. The combination with a manually-operable switch for electric circuits, of a thermally-operable self-soldering device, a spring-controlled means normally held in a set position by the thermally-operable device and adapted to automatically operate the said switch when released from the said device, under abnormal current conditions, the said switch being adapted to automatically set the spring-controlled means to operative position when manually operated, and also being capable of being manually opened and closed after said spring-controlled means is set, independently of the latter or of the thermally-operable device.

21. In a thermal protector for electric circuits, a piece of resistance material for inclusion in the circuit, a ring placed upon the resistance material and held thereto by a heat susceptible material, means for holding the resistance material in a fixed position, and means for turning the said ring upon the resistance material when the heat susceptible material is softened.

22. In a cut-out or protector for telephone and telegraph lines, a resistance body for inclusion in the electric circuit, a rotary detent electrically connected with the said resistance body and acted upon by a force tending to break the circuit and cementing material for holding the detent against rotation under normal circuit conditions and adapted to be fused or softened under abnormal circuit conditions to permit said detent to turn and the circuit to be broken by the force acting on said detent.

23. In apparatus of the class specified, the combination of means for opening the circuit, a device operable upon an excess of current in the circuit, and means whereby the operation of the circuit opening means automatically resets the excess current operated device.

24. The combination of mechanism for controlling the circuit, means operable upon an excess of current, said means being arranged to govern the circuit controlling mechanism and being arranged to be actuated by such mechanism when the latter is operated, and means for resetting such excess current operated device to operative condition.

25. In apparatus of the class specified, the combination of a heat concentrating device, a wheel having a plurality of engaging devices, a small quantity of heat susceptible material holding said wheel normally in position, and a circuit-controlling spring arranged to engage one of the engaging devices of said wheel and adapted to turn the wheel so as to bring another engaging device into position for engagement when the wheel is released by the softening of the heat susceptible material.

26. In apparatus of the class specified, the combination of a heat producing means, a rotary detent normally held against rotation by a heat susceptible material, and a circuit controlling means adapted to produce a relative turning between the heat producing means and the rotary detent, when the heat susceptible material is softened.

27. In combination, mechanism for controlling a circuit, and an electro-thermally-operable device arranged to coöperate with the circuit-controlling mechanism and provided with heat susceptible material which material relaxes during operation and resumes its normal condition after operation.

28. A device of the character described, provided with heat susceptible material for normally detaining circuit-controlling mechanism, and allowing the latter to control a circuit upon abnormal heating, the parts of the said device being so arranged that when the abnormal heating subsides, the heat susceptible material again places the device in condition for again detaining the circuit-controlling mechanism.

29. In combination, mechanism for controlling a circuit, means for producing heat, and heat susceptible material arranged to be effected by heat from the heat-producing means to allow the apparatus to operate when excessively heated and to resolder the apparatus when the excessive heating subsides, to permit of resetting and another operation thereof.

30. In a device of the character described, heat-susceptible material rigidly securing portions thereof together when cool and allowing a relative movement of the said portions when excessively heated, the latter being again rigidly secured together by the heat-susceptible material after the excessive heating subsides.

31. An electrical controller comprising thermally operable securing means releasable on a change in electrical circuit conditions, and having provisions whereby it is automatically resecured in operable condition preparatory for another operation.

32. An electrical circuit protector comprising solder controlled devices for protecting the circuit on the passage of an unduly strong current, and having provisions for automatically resoldering itself preparatory for another operation.

33. An electrical circuit protector comprising a movable part, a solder joint for normally securing said part in position, a thermal device for releasing said solder joint, and means for moving said movable part, said protector having provisions for automatically resoldering said joint with the protector in operative condition.

34. An electrical circuit protector comprising means operable upon an excess of current for protecting the circuit, and having provisions whereby it is automatically reset and resoldered in reset condition.

35. A thermally operable electrical controller having provisions for automatically resecuring in operative condition parts released upon operation.

36. A solder-joint, electrical circuit protector having provisions for automatically resoldering in operative condition parts released upon operation.

37. In an electrical circuit protector, the combination of a quantity of cementing material, means for softening said material on the passage of an unduly strong current, a movable part normally held against movement by said cementing material, and means for moving said part when the same is released by the passage of an unduly strong current, said part being moved into position for another operation and associated with said cementing material after movement, whereby said part is automatically recemented after movement.

38. In an electrical circuit protector, the combination of a movable part normally held against movement by a solder joint, means for softening the solder of said joint on the passage of an unduly strong current, and means for moving said part when the same is released by the softening of the solder, said part being moved into position for another operation and being associated with the solder after such movement, whereby the parts are resoldered or self-soldered preparatory for another operation.

39. A solder joint electrical circuit protector having provisions for automatically resoldering itself in operative condition.

40. In an apparatus of the class specified, the combination of a device operable upon an excess of current, and means whereby said device upon operation is simultaneously reset for a subsequent operation.

41. In apparatus of the class specified, the combination of a heat concentrating device, a small quantity or body of material adapted to be affected by heat generated in the heat concentrating device, circuit controlling means, a plurality of devices each adapted to engage the circuit controlling means, said devices being subject to said body or mass of material, and the circuit controlling means being adapted in successive operations to bring said devices one after another into position for engagement.

42. In apparatus of the class specified, the combination of a heat producing means, a rotary detent normally held against rotation by heat susceptible material, and circuit controlling means adapted to produce a relative turning between the heat producing means and the rotary detent, when the heat susceptible material is softened.

43. An electrical circuit protector comprising means for controlling the circuit, and having provisions whereby it is operated to control the circuit and simultaneously reset for a subsequent operation.

44. A self-soldering electric circuit protector, comprising means for controlling the circuit, and having provisions whereby upon operation it is simultaneously reset for a subsequent operation.

As inventor of the foregoing, I hereunto subscribe my name this 25th day of May, A. D. 1904.

EDWARD W. LEEPER.

Witnesses:
FRANK B. COOK,
FREDERICK R. PARKER.